United States Patent [19]

Rankin et al.

[11] Patent Number: 4,502,060

[45] Date of Patent: Feb. 26, 1985

[54] BARRIERS FOR THERMAL INK JET PRINTERS

[75] Inventors: Glenn H. Rankin, Menlo Park; Harold W. Levie, Livermore, both of Calif.

[73] Assignee: Hewlett-Packard Company, Palo Alto, Calif.

[21] Appl. No.: 490,683

[22] Filed: May 2, 1983

[51] Int. Cl.[3] .............................................. G01D 15/18

[52] U.S. Cl. .............................................. 346/140 R

[58] Field of Search .................................... 346/140 R

[56] References Cited

U.S. PATENT DOCUMENTS 4,364,066 12/1982 Koto .............................. 346/140 R 4,394,670 7/1983 Sugitani et al. ................. 346/140 R

*Primary Examiner*—E. A. Goldberg

*Assistant Examiner*—Gerald E. Preston

*Attorney, Agent, or Firm*—Douglas A. Kundrat; Joseph H. Smith

[57] ABSTRACT

A thermal ink jet print head is provided having a new and improved barrier design. Two barriers are provided for each resistor, the barriers partially surrounding the resistor. The barriers are spaced apart to provide ink feed channels to the resistor and are arranged to impart angular momentum to the ink relative to the resistor during refill on bubble collapse.

6 Claims, 4 Drawing Figures

BARRIERS FOR THERMAL INK JET PRINTERS

BACKGROUND OF THE INVENTION

This invention relates to a new and improved barrier design for separating resistors in a thermal ink jet printer.

The prior art with regard to thermal ink jet printing is adequately represented by the following U.S. Pat. Nos.: 4,243,994; 4,296,421; 4,251,824; 4,313,124; 4,325,735; 4,330,787; 4,334,234; 4,335,389; 4,336,548; 4,338,611; 4,339,762; 4,345,262; 4,345,263; and 4,353,079. The basic concept there disclosed is a device having an ink-containing capillary with an orifice for ejecting ink, and an ink heating mechanism, generally a resistor, in close proximity to the orifice. In operation, the ink heating mechanism is quickly heated, transferring a significant amount of energy to the ink, thereby vaporizing a small portion of the ink and producing a bubble in the capillary. This in turn creates a pressure wave which propels an ink droplet or droplets from the orifice onto a nearby writing surface. By controlling the energy transfer to the ink, the bubble quickly collapses before it can escape from the orifice.

In these systems, bubble collapse can cause cavitation damage to the resistor and premature failure of the device. It is known in the art that barriers placed between adjacent resistors to inhibit cross-talk lengthen device lifetime, and that enclosing each resistor on three-sides further increases lifetime. However, with three-sided barriers, ejected ink droplets do not travel perpendicular to the plane of the resistor structure, and cavitation damage to the resistor still remains a primary mode of failure.

SUMMARY OF THE INVENTION

In accordance with the preferred embodiments of the invention, a thermal ink jet print head is provided having a new and improved barrier design which contributes significantly to device lifetime. Located between an orifice plate and a substrate are two substantially L-shaped barriers which are placed on opposite sides of an ink heating resistor. The arrangement of the barriers is such as to partially surround the resistor and to define two ink feed channels on opposite sides. The ink feed channels are located so that incoming ink from the two channels travels in opposite directions, ink from the first channel being directed along one edge of the resistor and ink from the second channel being directed along an edge on the opposite side of the resistor, so as to impart angular momentum to the incoming fluid.

DETAILED DESCRIPTION OF THE INVENTION

Figure 1A:
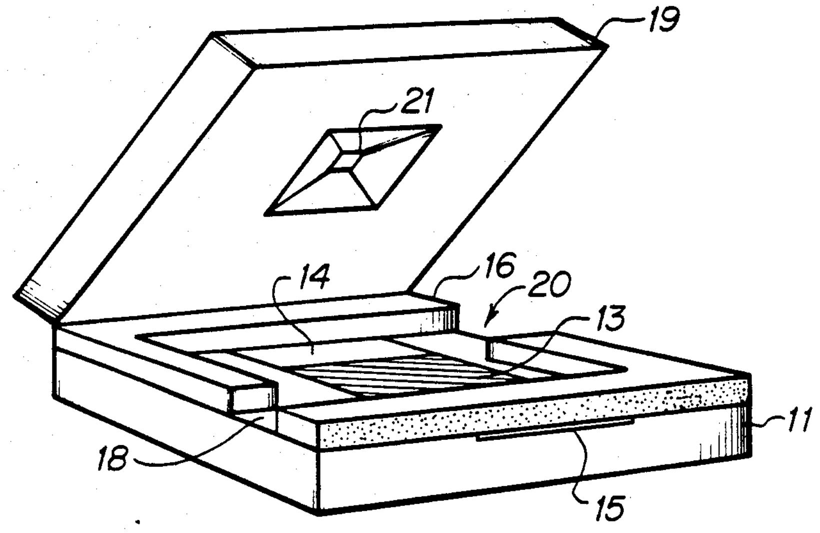
FIGS. 1A and 1B show oblique views of an ink jet print head according to the invention.
Figure 1B:
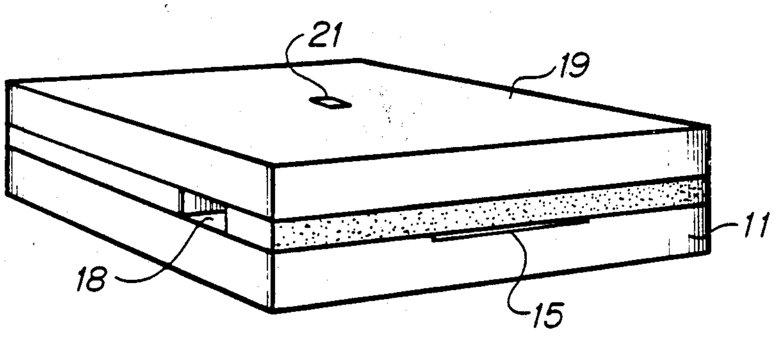

Shown in FIGS. 1A and 1B is a portion of a thermal ink jet print head according to the invention. Typically, the device is made up of a substrate 11, a resistor 13 on the substrate, electrical leads 14 and 15 for supplying power to the resistor, barriers 16 and 17 for maintaining a separation between adjacent resistors and for providing a capillary channel for feeding ink between the substrate and an orifice plate 19, and an orifice 21 substantially opposite the resistor. Particular materials and general dimensions are all well known in the art.

Figure 2:
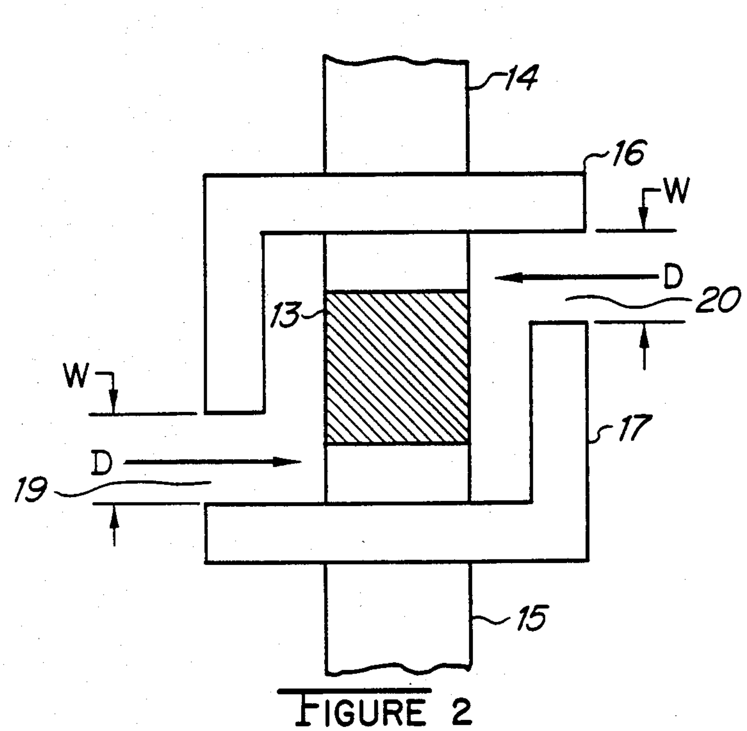
FIG. 2 is a top view of the ink jet print head of FIGS. 1A and 1B with the orifice plate removed.

As can be seen more clearly from FIG. 2, the arrangement of barriers 16 and 17 is considerably different from the prior art. The barriers are generally L-shaped and located relative to each other so that as the region over and around the resistor refills with ink during bubble collapse, ink will be drawn in through ink feed channels 18 and 20 with a velocity having a direction substantially as indicated by D, where D is directed along the periphery of the resistor and not directly toward its center.

Although the mechanism is not entirely understood, it is thought that the above barrier configuration contributes to resistor lifetime by slowing the bubble collapse. The general concept is that the shape of the barriers and the entry direction they provide impart angular momentum to the fluid as the bubble collapses on or near the resistor. Thus, a circular motion is established on the inner surface of the fluid (i.e., the surface which defines the bubble). As the bubble collapses, the negative gauge pressure in the bubble pulls the fluid toward the center of the bubble, and as the collapse continues the inner surface of the fluid rotates faster due to conservation of angular momentum. Finally, the viscosity of the fluid slows the rotation and dissipates the energy of the collapse as thermal motion. Hence, the speed of collapse can be controlled by varying the viscosity of the fluid and the amount of angular momentum initially introduced.

By applying this concept to the embodiment illustrated in FIGS. 1 and 2, it is apparent that for a given fluid, the amount of circular motion and, hence, the rate of collapse, can be controlled by varying the width W, which corresponds to the opening permitting ink to enter the resistor region. Also, it should be noted that by providing symmetric barriers, droplets tend to be ejected in a direction perpendicular to the orifice plate, rather than at some other angle as is in devices with three-sided barriers.

Figure 3:
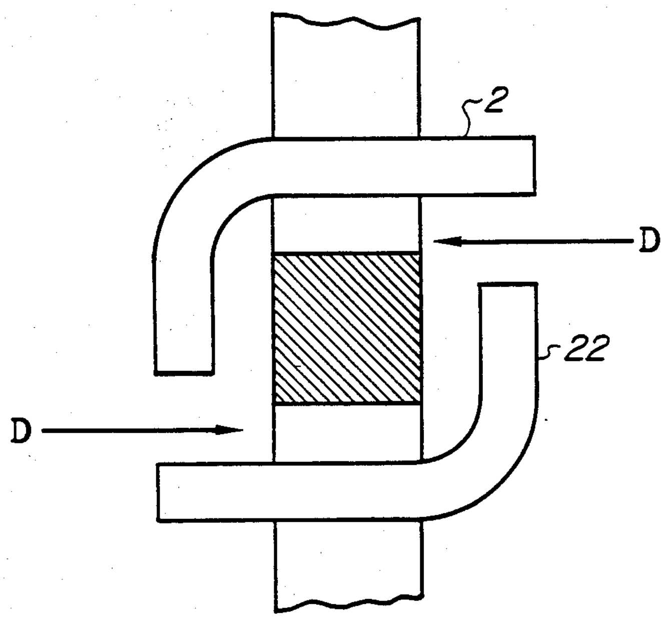
FIG. 3 is a top view of another embodiment of an ink jet print head according to the invention, again with the orifice plate removed.

FIG. 3 shows another embodiment of the invention having barriers 22 and 23 which are again substantially L-shaped, but which have rounded corners.

In addition, as will be apparent to those skilled in the art, the invention in its broadest concept is not limited to a system with two barriers. A device with a single barrier or with many barriers could also be used, provided the barrier design introduces angular momentum into the fluid.

What is claimed is:

1. An ink jet print head comprising:

a substrate;

an orifice plate having a surface spaced apart from said substrate for containing ink therebetween and having an orifice therein for ejecting ink;

heating means located on said substrate for producing bubbles in said ink; and barrier means, between said substrate and said surface, for partially surrounding said heating means for directing the flow of ink to said heating means in a generally circular direction other than toward the center of said heating means.

2. A device as in claim 1 wherein said barrier means further comprises:

a first barrier partially surrounding said heating means;

a second barrier separated from said first barrier in symmetrically opposed relationship thereto of said heating means and partially surrounding said heating means;

said separation between said first barrier and said second barrier defining two ink feed channels which direct the intake flow of ink in a direction initially parallel to the periphery of said heating means.

3. A device as in claim 2 wherein said first barrier and said second barrier have a substantially L-shape.

4. A device as in claim 3 wherein said first barrier and said second barrier are substantially identical in shape.

5. A device as in claim 4 wherein the arrangement of said first barrier, said second barrier, and said heating means has inversion symmetry about the center of said heating means in the plane of said substrate.

6. An ink jet print head comprising:

a substrate;

an orifice plate having a surface spaced apart from said substrate for containing ink therebetween and having an orifice therein for ejecting ink;

heating means located on said substrate for producing bubbles in said ink; and barrier means between said surface and said substrate for directing the flow of ink to said heating means in a manner which imparts angular momentum to said ink about an axis orthogonal to said surface.

* * * * *